US010569681B1

(12) United States Patent
Sardo

(10) Patent No.: US 10,569,681 B1
(45) Date of Patent: Feb. 25, 2020

(54) VEHICLE SEAT WITH SECURE INTERLOCKING PANELS

(71) Applicant: Louis Sardo, La Canada, CA (US)

(72) Inventor: Louis Sardo, La Canada, CA (US)

( * ) Notice: Subject to any disclaimer, the term of this patent is extended or adjusted under 35 U.S.C. 154(b) by 0 days.

(21) Appl. No.: 16/007,131

(22) Filed: Jun. 13, 2018

(51) Int. Cl.
*B60N 2/58* (2006.01)
*B60N 2/68* (2006.01)
*B60N 2/64* (2006.01)

(52) U.S. Cl.
CPC ............. *B60N 2/682* (2013.01); *B60N 2/643* (2013.01); *B60N 2/686* (2013.01); *B60N 2002/684* (2013.01); *B60N 2205/30* (2013.01)

(58) Field of Classification Search
CPC ......... B60N 2/643; B60N 2/682; B60N 2/686
USPC .............. 297/440.15, 451.8, 451.11, 452.12, 297/452.14, 452.16
See application file for complete search history.

(56) References Cited

U.S. PATENT DOCUMENTS

| | | | |
|---|---|---|---|
| 3,041,108 A * | 6/1962 | Cohn | A47C 7/425 297/440.15 X |
| 3,111,689 A | 11/1963 | Mulhauser, Jr. | |
| 3,198,578 A | 8/1965 | Geoffrey et al. | |
| 3,556,594 A | 1/1971 | Anderson | |
| 3,669,495 A * | 6/1972 | Von Rudgisch | A47C 4/02 297/451.11 |
| 3,685,063 A | 8/1972 | Morgan | |
| 3,797,887 A | 3/1974 | Barecki et al. | |
| 3,801,154 A | 4/1974 | Hultquist et al. | |
| 3,873,155 A | 3/1975 | Barecki | |
| 4,077,665 A * | 3/1978 | Storch | A47C 5/125 297/452.16 X |
| 4,436,343 A * | 3/1984 | Schneider | A47C 5/12 297/452.16 X |
| 4,527,832 A | 7/1985 | McMains et al. | |
| 4,580,841 A * | 4/1986 | Raftery | A47C 4/02 297/451.8 |
| 4,583,782 A | 4/1986 | Mikuniya | |
| 4,607,887 A | 8/1986 | Vail | |
| 4,717,202 A * | 1/1988 | Batchelder, III | A47C 11/00 297/452.14 X |
| 4,917,931 A | 4/1990 | McDowell et al. | |
| 4,955,095 A | 9/1990 | Gerrick | |
| 5,061,539 A | 10/1991 | McDowell et al. | |
| 5,403,066 A | 4/1995 | Drum | |
| 5,405,179 A | 4/1995 | Jih | |
| 5,407,247 A | 4/1995 | Forcier et al. | |

(Continued)

*Primary Examiner* — Rodney B White
(74) *Attorney, Agent, or Firm* — Goldstein Law Offices, P.C.

(57) ABSTRACT

A vehicle seating unit comprising a seat frame, a back panel, and a seat panel, the seat frame has a horizontal portion adapted to receive the seat panel and a vertical portion adapted to receive the back panel. The seat panel and the back panel are attached to the horizontal portion and the vertical portion by a plurality of panel fasteners and seat frame fasteners. The back panel top edge is secured to the vertical portion by a retaining cap, while the seat panel front edge is secured to the seat frame by a retaining hook. The back panel and seat panel are positioned in an interlocking arrangement whereby the back panel lower edge pushes downwardly against the seat panel, preventing the seat panel rear edge from being detached. The panel and seat frame fasteners prevent disengagement by hand, but can be overcome by a lever to facilitate maintenance.

10 Claims, 10 Drawing Sheets

(56) References Cited

U.S. PATENT DOCUMENTS

| | | | | |
|---|---|---|---|---|
| 5,487,587 | A | | 1/1996 | Hylton |
| 5,503,454 | A | | 4/1996 | Sakamoto |
| 5,609,395 | A | * | 3/1997 | Burch ............... A47C 7/42 297/452.61 X |
| 5,704,691 | A | | 1/1998 | Olson |
| 5,826,939 | A | | 10/1998 | Beyer |
| 6,135,562 | A | | 10/2000 | Infanti |
| 6,415,494 | B1 | * | 7/2002 | Burch ............... A47C 7/42 264/46.5 |
| 6,736,454 | B1 | | 5/2004 | Sardo |
| 6,942,299 | B1 | | 9/2005 | Sardo |
| 2014/0306506 | A1 | * | 10/2014 | Ruspa ............... B60N 2/686 297/452.19 |

* cited by examiner

VEHICLE SEAT WITH SECURE INTERLOCKING PANELS

TECHNICAL FIELD

The present disclosure relates generally to a vehicular seat. More particularly, the present disclosure relates to a vehicle seat having secure panels in an interlocking arrangement.

BACKGROUND

Traditional vehicular seats, namely those seats employed by transit system buses and coaches, are often comprised of a hard material such as fiberglass or high-impact synthetic resins and plastics. These materials are often employed due to their resilient nature. In particular, they are not vulnerable to destruction from intentional vandalism or high-volume commuter wear and tear. Furthermore, seats of this construction are also easily maintained in that they may be readily scrubbed with harsh abrasives to remove stains and markings, without obvious damage to the seat's finish.

However, while seats of this construction are easily maintainable, they tend to fail to provide even the slightest level of comfort to a commuter seated thereupon. They are cold during the winter and hot during the summer. The rigid construction can cause upper and lower back pains after short periods of time, as well as discomfort to the user's buttocks and thighs. The passenger can easily slide across and even off of the seat during sudden starts and stops.

A seating surface which employs softer and more cushioned seating surfaces is needed. Unfortunately, equipping commuter bus or coach seats with a more flexible and soft supple cloth-like material, as is often used in small passenger vehicles, is not feasible since these types of seats are easily damaged, cut, and marred. Replacing an entire such seat assembly in response to damage, cutting or marring is extremely cost prohibitive. Accordingly, a device or system is needed which permits a commuter bus or coach seat to provide comfort to a user, without all of the problems inherent in the systems mentioned above.

As a result, seating inserts and panels are commonly employed to provide a comfortable, yet vandalism proof structure. However, with the ubiquitous use of seating inserts in buses, trains, and other public transportation vehicles throughout the country, a new difficulty has emerged—the problem of unauthorized removal of the inserts themselves. In addition to loss from theft, since the inserts are often made of hard plastic or metal, some municipalities are concerned that a passenger might pry one up from the seat frame and use it to harm other passengers. Consequently, many cities and municipalities now mandate that the inserts are fastened securely to the seat, and made tamperproof, in an attempt to prevent their unauthorized removal by a passenger. The result of their efforts to make them tamperproof, however, is that the inserts are also difficult and time consuming to remove by authorized personnel.

The conventional way of securing the inserts to a seat frame and ensuring they cannot be removed, is to employ six to eight metal straps, each held to the seat frame by two screws each, to ensure the inserts cannot be removed. As a result, it can easily take a mechanic 15-30 minutes to remove a single pair of inserts. Thus, replacing and reconditioning a transit vehicle with new inserts can take days and cost thousands of dollars in labor alone.

While these units may be suitable for the particular purpose employed, or for general use, they would not be as suitable for the purposes of the present disclosure as disclosed hereafter. A need therefore exists for a seating unit which not only prevents the unauthorized removal of inserts or panels, but also allows a mechanic to quickly install or remove the inserts or panels with minimal usage of tools, significantly reducing the time and cost required to replace or recondition the seating on a transit vehicle.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a vehicle seating unit which has panels which securely interlock to prevent unauthorized removal. Accordingly, the present disclosure provides a seating unit comprising a seat frame, a back panel, a seating panel, and a plurality of panel fasteners and seat frame fasteners which facilitate the attachment of the seat panel and the back panel to the set frame. The seat frame has a horizontal portion and a vertical portion, and the seat panel is attached to the horizontal portion while the back panel is attached to the vertical portion. The seat panel has a seat panel rear edge and a seat panel front edge, while the back panel has a back panel lower edge and a back panel top edge. The vertical portion further has a retaining cap which secures the back panel top edge and further exerts a downward force against the back panel. The seat panel rear edge and the back panel bottom edge push against each other in an interlocking arrangement such that the downward force exerted by the back panel prevents the seat panel rear edge from being lifted off the horizontal portion. In addition, the seat panel front edge is secured to the seat frame front edge via a retaining hook.

It is another aspect of an example embodiment in the present disclosure to provide a vehicle seating unit which allows the seating panel and back panel to be quickly installed and removed by maintenance personnel. Accordingly, the panel fasteners and seat frame fasteners are hook and loop fasteners, allowing the seat panel and back panel to be attached to the seat frame without the use of tools. Furthermore, the panel fasteners and seat frame fasteners have a peel strength which is sufficient to prevent a person from detaching the seat panel or the back panel by the seat frame by hand, while still allowing maintenance personnel to detach said panels by using a lever to overcome the peel strength.

It is yet another aspect of an example embodiment in the present disclosure to provide a vehicle seating unit having a seat panel which exerts an upward force against the back panel. Accordingly, the seat frame further has a transition portion which curves upwardly and joins the horizontal portion to the vertical portion. The seat panel is flexible and the seat panel rear edge is adapted to deflect upwardly. The seat panel has a length sufficient to cause the seat panel rear edge to contact the back panel as the seat panel is lowered into place at an angle while the seat frame front panel is attached to the seat frame via the retaining hook. The seat panel rear edge deflects as a downward force is applied to the seat panel, allowing the seat panel rear edge to snap into place below the back panel lower edge. The seat panel is securely attached to the horizontal portion and the seat panel rear edge conforms to the curved shape of the transition portion, while the tension within the seat panel ensures that the seat panel rear edge continues to exert an upwards force against the back panel.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
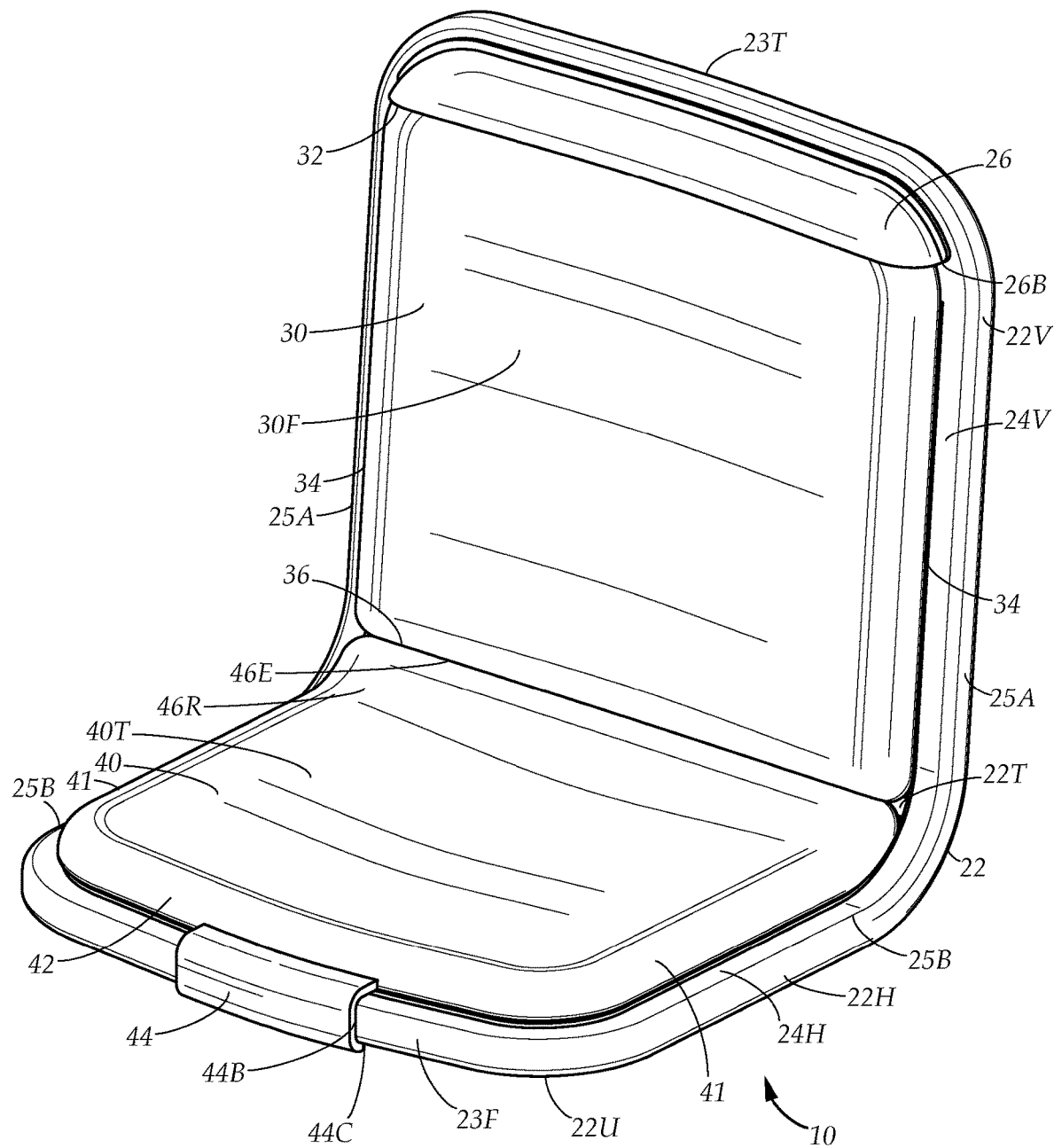
FIG. 1 is diagrammatical perspective view of the seating unit showing a back panel and seat panel attached to a seat frame, in accordance with an embodiment of the present disclosure.

FIG. 1 illustrates a seating unit 10 comprising a seat frame 22, a back panel 30, and a seat panel 40. The seat frame 22 has a horizontal portion 22H and a vertical portion 22V which is substantially perpendicular to the horizontal portion 22H. The horizontal portion 22H and the seat panel 40 are adapted to support a person in a sitting position, while the vertical portion 22V and the back panel 30 are adapted to support the back of the person. The seat panel 40 and back panel 30 are adapted to attach to the vertical portion 22V and the horizontal portion 22H respectively such that the seat panel 40 and back panel 30 form an interlocking arrangement, thereby preventing a person from removing the seat panel 40 or the back panel 30 by hand without the assistance of tools. The attachment of the back panel 30 and seat panel 40 to the seat frame 22 may be further facilitated using a plurality of panel fasteners which engage with a plurality of seat frame fasteners disposed on the seat frame 22. The seating unit 10 is adapted for use within vehicles such as buses, trains, or other transit vehicles, and the back panel 30 and seat panel 40 may be quickly installed or removed for cleaning, replacement, or maintenance, while also preventing the unauthorized removal of the back panel and seat panel by passengers of the vehicle. However, the features of the seating unit 10 may also be adapted for use with general purpose seating and are not solely limited for use within vehicles.

In a preferred embodiment, the seat frame 22 further comprises a transition portion 22T which is curved in shape and joins the horizontal portion 22H to the vertical portion 22V. The horizontal portion 22H extends horizontally from the transition portion 22T and has a front frame edge 23F and a pair of horizontal sides 25B. The vertical portion extends upwardly away from the transition portion 22T and has a seat frame top edge 23T and a pair of vertical sides 25A. The horizontal portion 22H has a horizontal face 24H which is adapted to receive the seat panel 40, and a frame bottom 22U opposite the horizontal face 24H. The vertical portion 22V has a vertical face 24V which is adapted to receive the back panel 30, and a retaining cap 26 which is disposed on the vertical face 24V proximate to the seat frame top edge 23T.

Figure 2A:
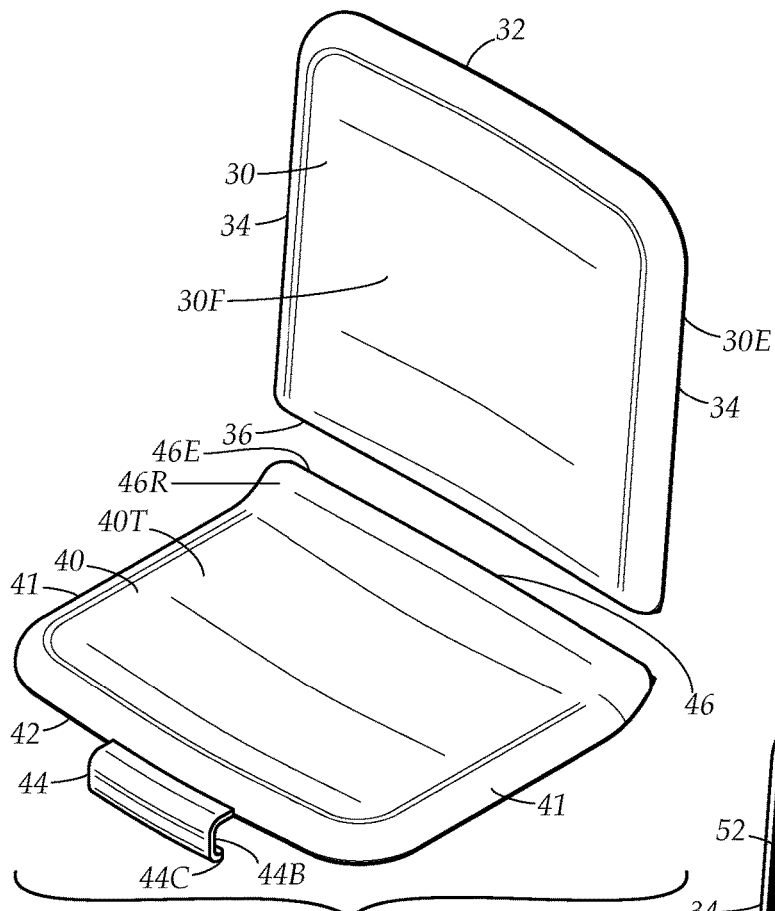
FIG. 2A is a diagrammatical perspective view of the back panel and the seat panel, in accordance with an embodiment of the present disclosure.
Figure 2B:
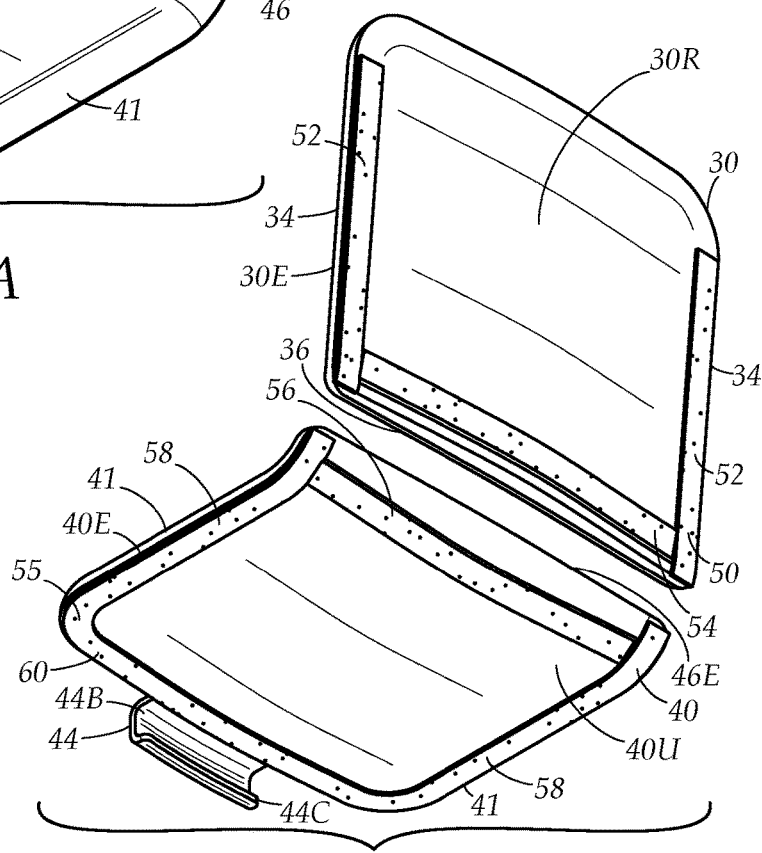
FIG. 2B is a diagrammatical perspective view showing the back panel and the seat panel from below and depicting a plurality of panel fasteners, in accordance with an embodiment of the present disclosure.

Turning to FIGS. 2A-B while continuing to refer to FIG. 1, the back panel 30 and seat panel 40 may be substantially rectangular in shape. The back panel 30 has a back panel outer edge 30E, which in turn has a back panel top edge 32, a back panel lower edge 36, and a pair of back panel sides 34 which extend between the back panel top edge 32 and back panel lower edge 36. The back panel 30 further has a back panel front face 30F and a back panel rear face 30R disposed opposite to the back panel front face 30F. The seat panel 40 has a seat panel outer edge 40E having a seat panel front edge 42, a seat panel rear 46 which has a seat panel rear edge 46E, and a pair of seat panel sides 41 which extend between the seat panel front edge 42 and the seat panel rear 46. The seat panel 40 further has a retaining hook 44 extending horizontally from the seat panel front edge 42 which is adapted to catch and hook onto the front frame edge 23F. The retaining hook 44 has a bend 44B and a retaining hook edge 44C which curves down and back towards the seat panel front edge 42, giving the retaining hook 44 a "J" shape when viewed from the side.

In a preferred embodiment, the seat panel rear 46 has a raised portion 46R which extends upwardly at an angle and is adapted to conform to the curved shape of the transition portion 22T. When the back panel 30 and seat panel 40 are installed upon the seat frame 22 in the interlocking arrangement, the back panel lower edge 36 is adapted to align with the seat panel rear edge 46E proximate to the transition portion 22T of the seat frame 22, such that the seat panel rear edge 46E abuts against the back panel lower edge 36. The retaining cap 26 is adapted to receive and enclose the back panel top edge 32, thereby preventing the back panel 30 from being pushed upwardly along the vertical face 24V.

Figure 3:
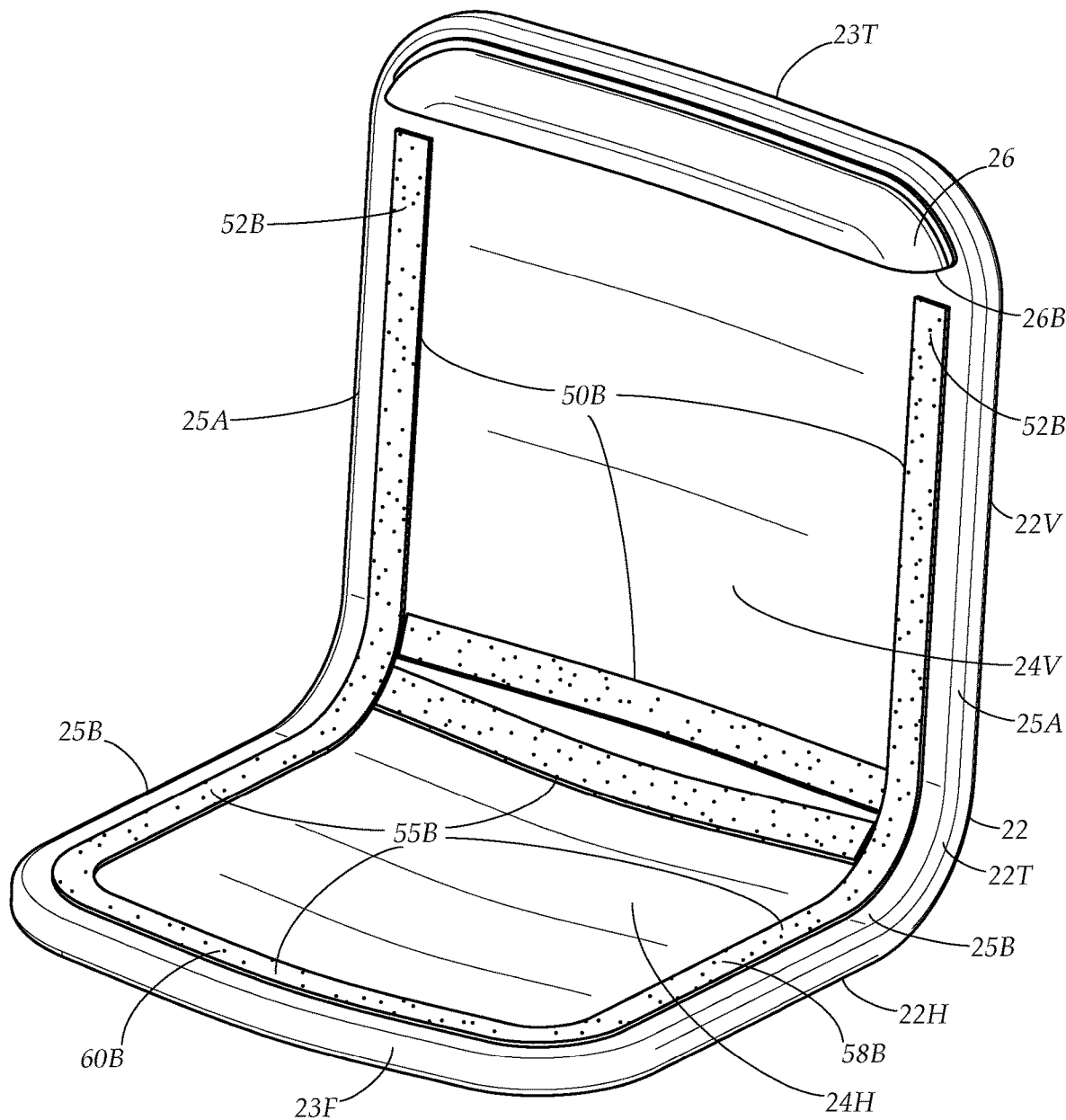
FIG. 3 is a diagrammatical perspective view of the seat frame with the back panel and seat panel detached, showing a plurality of seat frame fasteners, in accordance with an embodiment of the present disclosure.

Turning now to FIG. 3 while continuing to refer to FIGS. 2A-B, the seating unit further has a plurality of panel fasteners and a plurality of seat frame fasteners. The panel fasteners are disposed on the back panel rear face 30R and the seat panel bottom face 40U, and are adapted to engage with and connect to the seat frame fasteners disposed on the vertical face 24V and the horizontal face 24H. In a preferred embodiment, the panel and seat frame fasteners are implemented as hook and loop fasteners which allow the back panel 30 and seat panel 40 to be installed without the use of tools. Furthermore, the panel and seat frame fasteners have a peel strength sufficient to prevent the seat panel 40 and back panel 30 from being removed from the seat frame 22 by hand.

In a preferred embodiment, the panel fasteners comprise a plurality of back panel fasteners 50 and a plurality of seat panel fasteners 55, while the seat frame fasteners comprise vertical portion fasteners 50B and horizontal portion fasteners 55B. The back panel fasteners 50 are disposed on the back panel rear face 30R proximate to the back panel outer edge 30E, and are adapted to engage with the vertical portion fasteners 50B disposed on the vertical face 24V proximate to the seat frame top edge 23T and the vertical sides 25A. The seat panel fasteners 55 are disposed on the seat panel bottom face 40U proximate to the seat panel outer edge 40E, and are adapted to engage with the horizontal portion fasteners 55B disposed on the horizontal face 24H proximate to the front frame edge 23F and the horizontal sides 25B. As shown in FIG. 2B, the seat panel fasteners 55 may extend fully along the seat panel outer edge 40E. For example, the seat panel fasteners 55 may comprise a seat panel rear fastener 56 proximate to the seat panel rear edge 46E, a pair of seat panel side fasteners 58 proximate to each of the seat panel sides 41, and a seat panel front fastener 60 proximate to the seat panel front edge 42. Similarly, the back panel fasteners 50 may extend along the back panel sides 34 and the back panel lower edge 36, and may comprise a pair of back panel side fasteners proximate to the back panel sides 34, and a back panel lower fastener 54 proximate to the back panel lower edge 36. By positioning the panel fasteners proximate or adjacent to the back panel outer edge 30E and the seat panel outer edge 40E, the engagement between the panel fasteners and the seat frame fasteners prevents a person from inserting fingers between the back or seat panels 30, 40 and the seat frame 22, thereby preventing the person from obtaining sufficient leverage to overcome the peel strength of the fasteners by hand.

Referring to FIG. 3 while continuing to refer to FIG. 2B, the seat frame fasteners comprise a plurality of vertical portion fasteners 50B disposed on the vertical face 24V, and a plurality of horizontal portion fasteners 55B disposed on the horizontal face 24H. The vertical portion fasteners 50B comprise a pair of vertical portion side fasteners 52B proximate to the vertical sides 25A, and a vertical portion lower fastener 54B disposed on the vertical face 24V proximate to the transition portion 22T. The horizontal portion fasteners 55B comprise a pair of horizontal portion side fasteners 58B proximate to the horizontal sides 25B, and a horizontal portion rear fastener disposed on the horizontal face 24H proximate to the transition portion 22T.

Figure 4A:
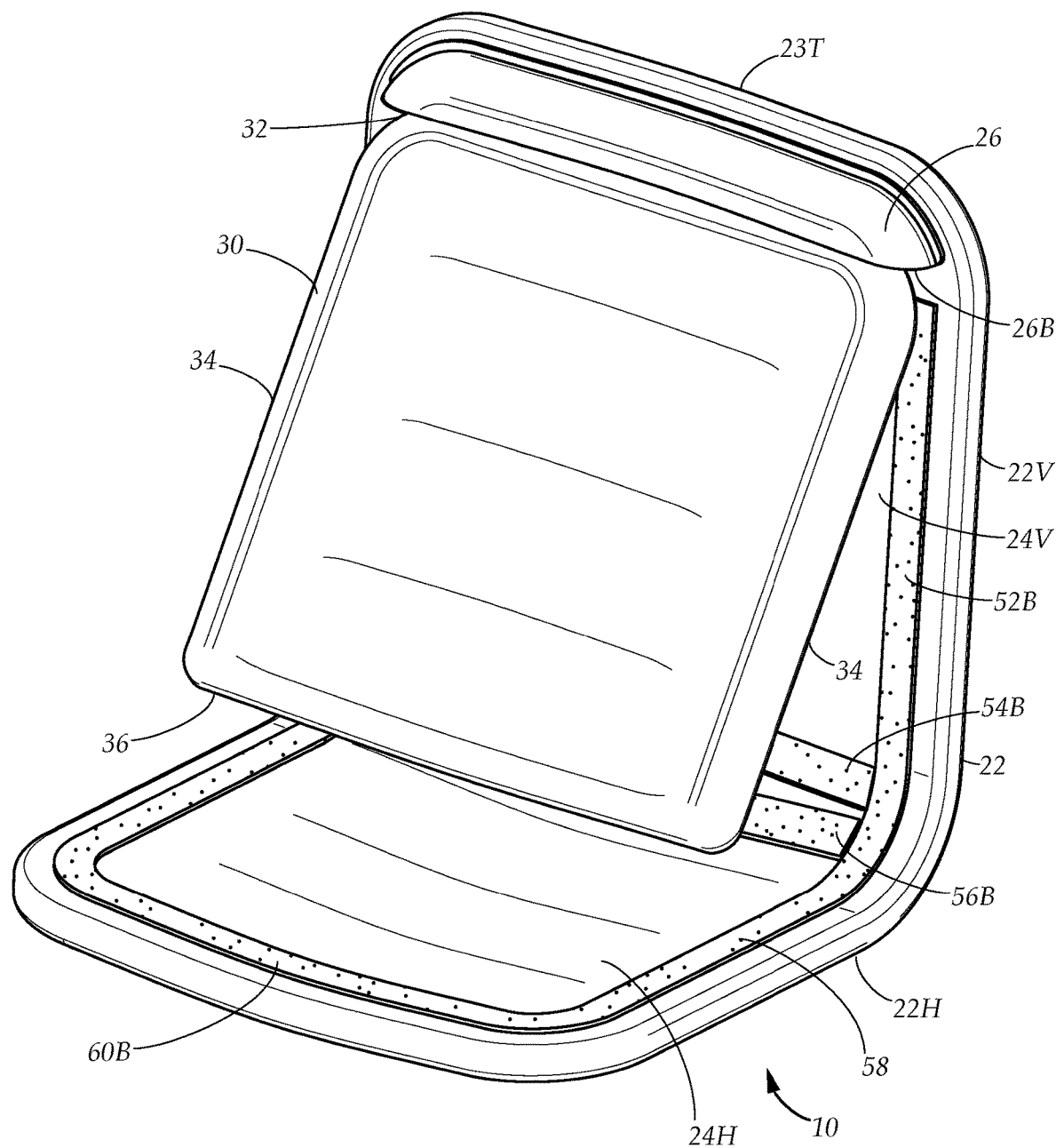
FIG. 4A is a diagrammatical perspective view of the seat frame and the back panel, showing the top edge of the back panel being inserted into a retaining cap disposed on the vertical portion, in accordance with an embodiment of the present disclosure.
Figure 4B:
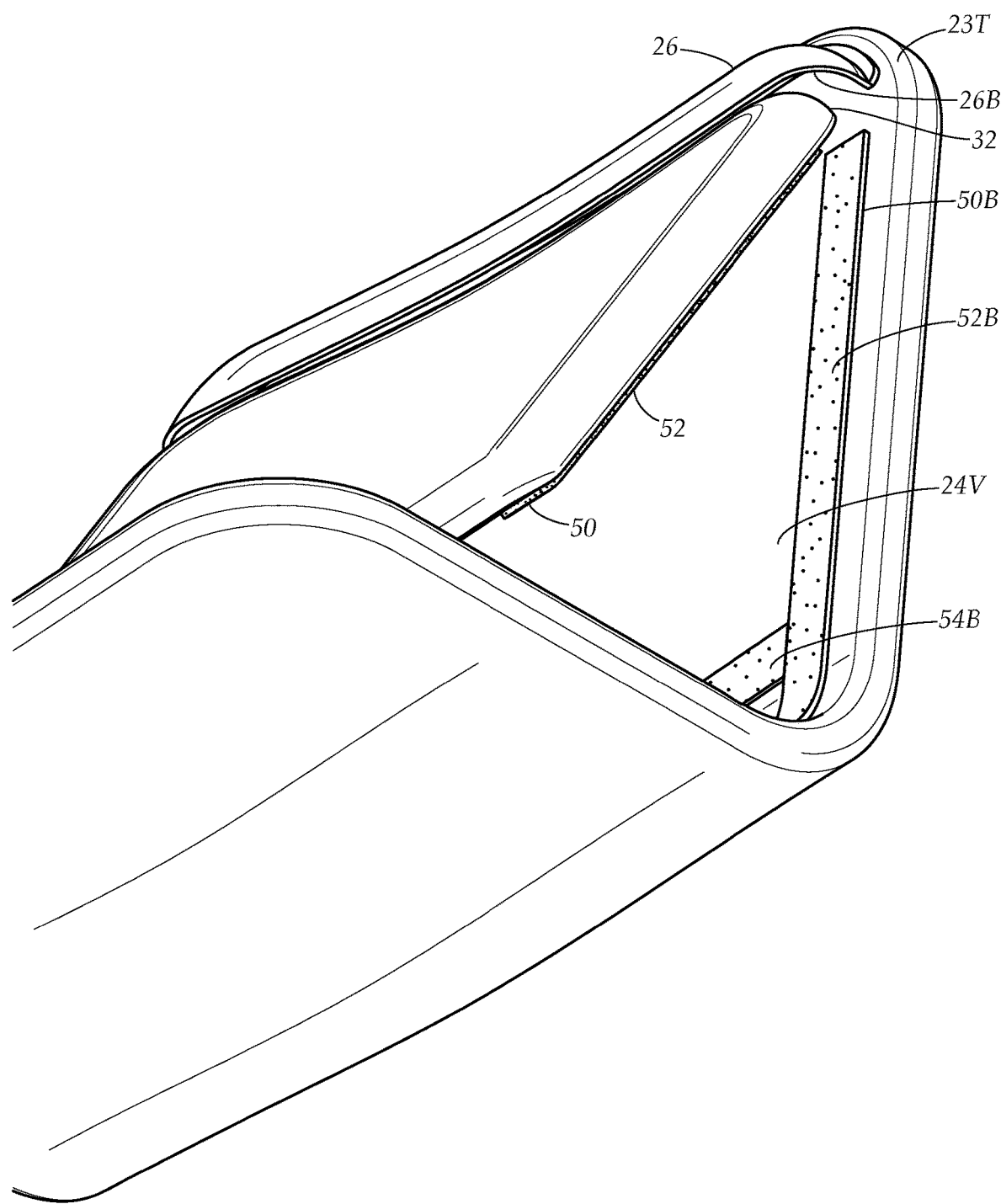
FIG. 4B is a diagrammatical perspective view of the back panel and the vertical portion of the seat frame seen from below, showing the retaining cap opening and the top edge of the back panel, in accordance with an embodiment of the present disclosure.
Figure 5:
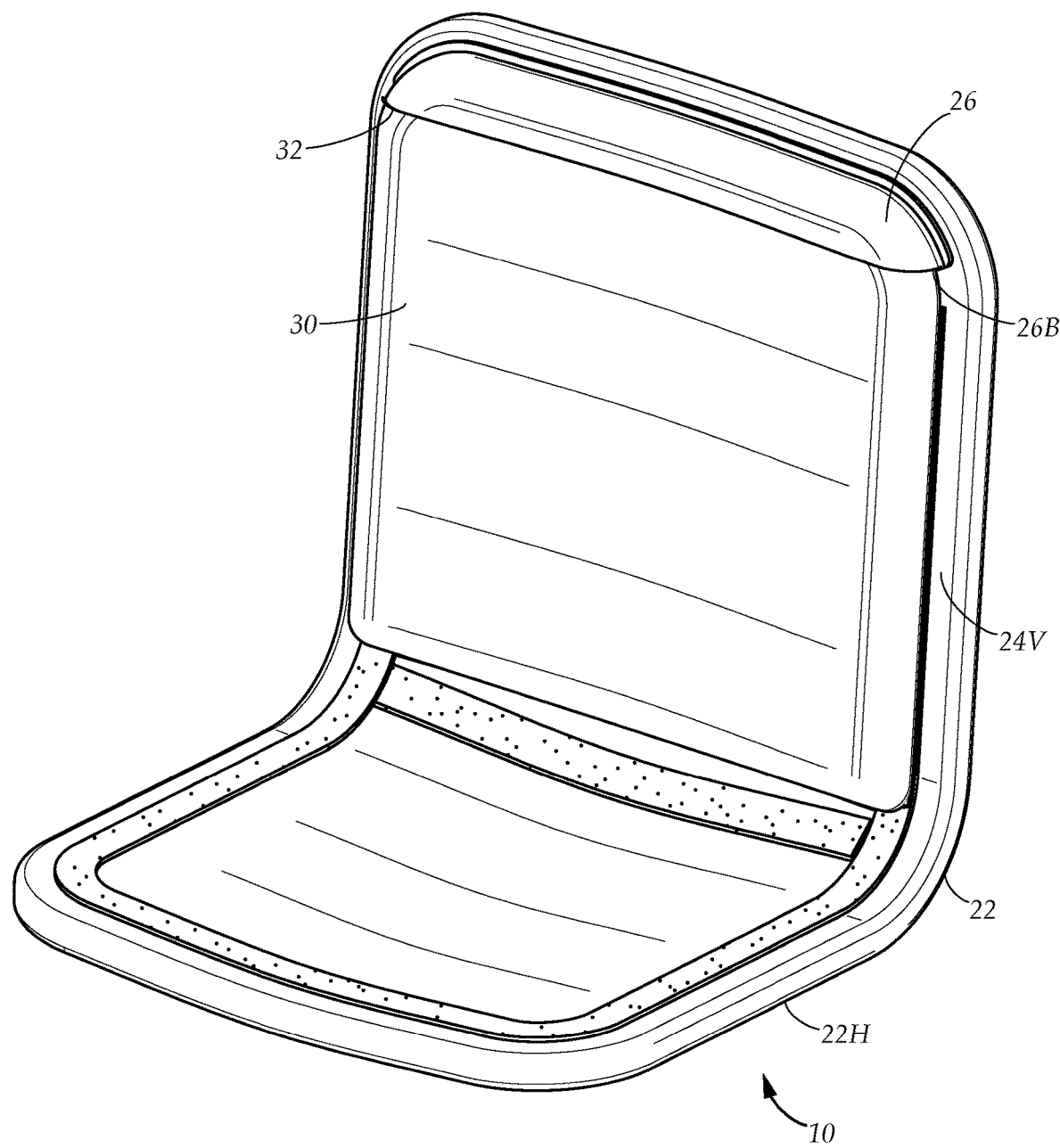
FIG. 5 is a diagrammatical perspective view of the back panel attached to the vertical portion of the seat frame, in accordance with an embodiment of the present disclosure.

Turning now to FIGS. 4A-B and FIG. 5, while also referring to FIG. 2B, the retaining cap 26 extends across the seat frame top edge 23T has a retaining cap opening 26B which opens downwardly facing the horizontal portion 22H. The retaining cap opening 26B is sized to receive and enclose the back panel top edge 32. The back panel 30 is attached to the seat frame 22 by inserting the back panel top edge 32 into the retaining cap opening 26B while the back panel rear face 30R is facing the vertical face 24V of the vertical portion 22V. To ensure that the back panel top edge 32 is fully in contact with the retaining cap 26 within the retaining cap opening 26B, the back panel top edge 32 is placed into the retaining cap opening 26B while the back panel 30 angled such that the back panel lower edge 36 is oriented away from the vertical face 24V. The back panel 30 is then lowered onto the vertical face 24V, causing the back panel fasteners 50 to engage with the vertical portion fasteners 50B, thereby securely fastening the back panel 30 to the vertical face 24V. Referring back to FIGS. 2B and 3 while continuing to refer to FIG. 4B, the back panel side fasteners 52 engage with the vertical portion side fasteners 52B, while the back panel lower fastener 54 engages with the vertical portion lower fastener 54B.

Figure 6:
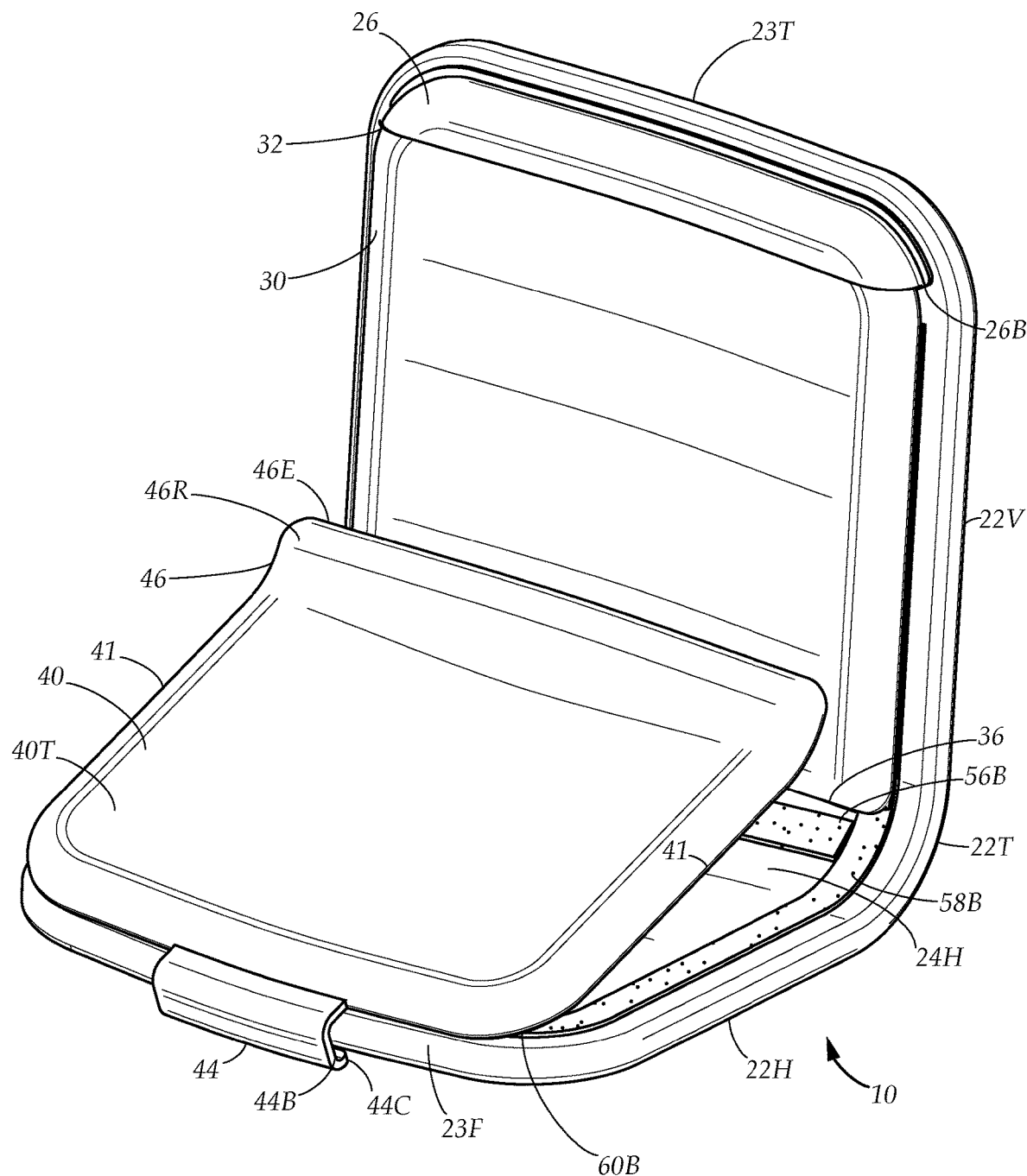
FIG. 6 is a diagrammatical perspective view of the seat panel being attached to the seat frame using a retaining hook which grips the front frame edge of the horizontal portion of the seat frame, in accordance with an embodiment of the present disclosure.
Figure 7:
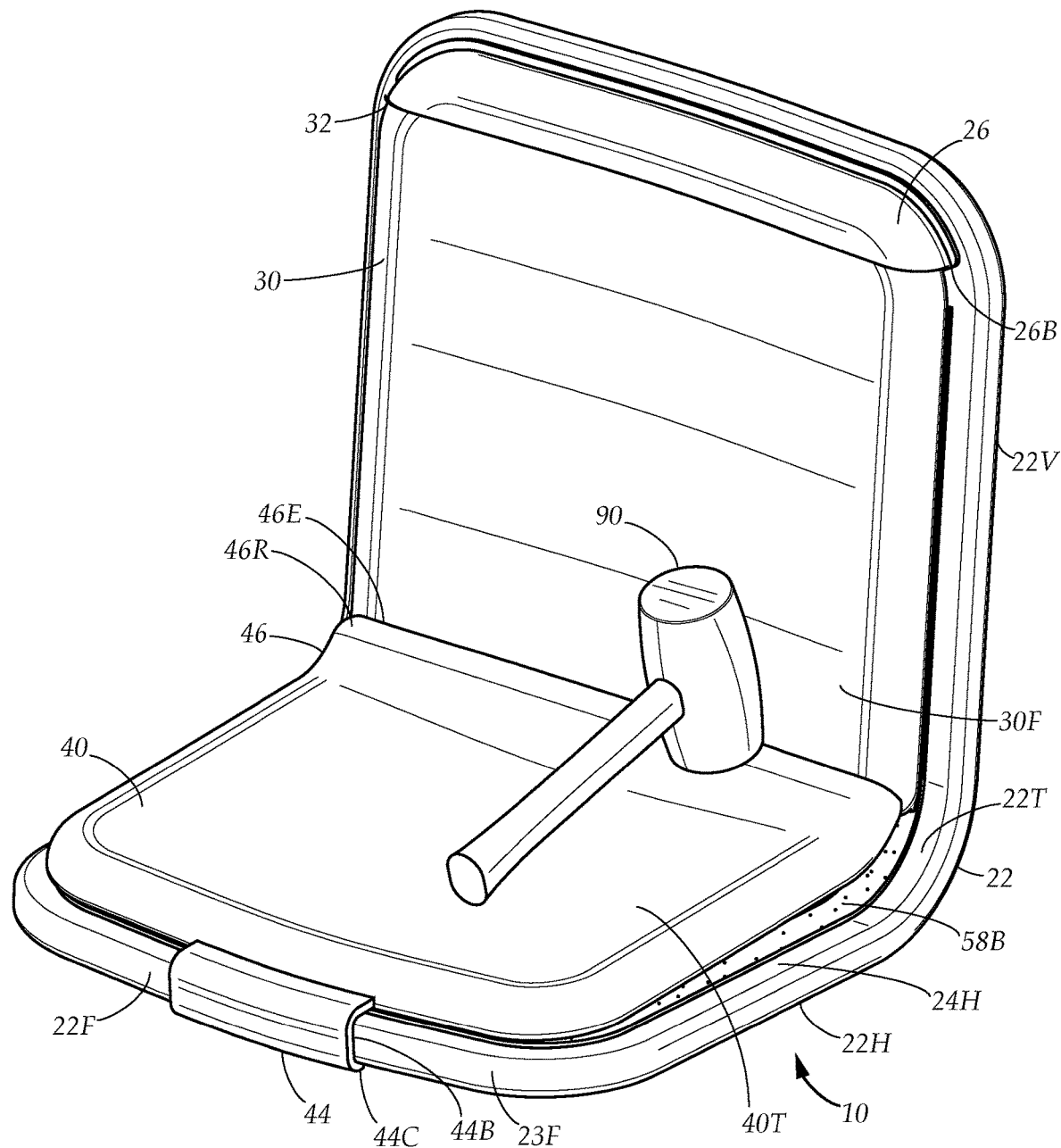
FIG. 7 is a diagrammatical perspective view of the seat panel being lowered onto the horizontal face of the horizontal portion so that the seat panel interlocks with the back panel, while the retaining hook holds the front edge of the seat panel in alignment with the front frame edge, in accordance with an embodiment of the present disclosure.
Figure 8:
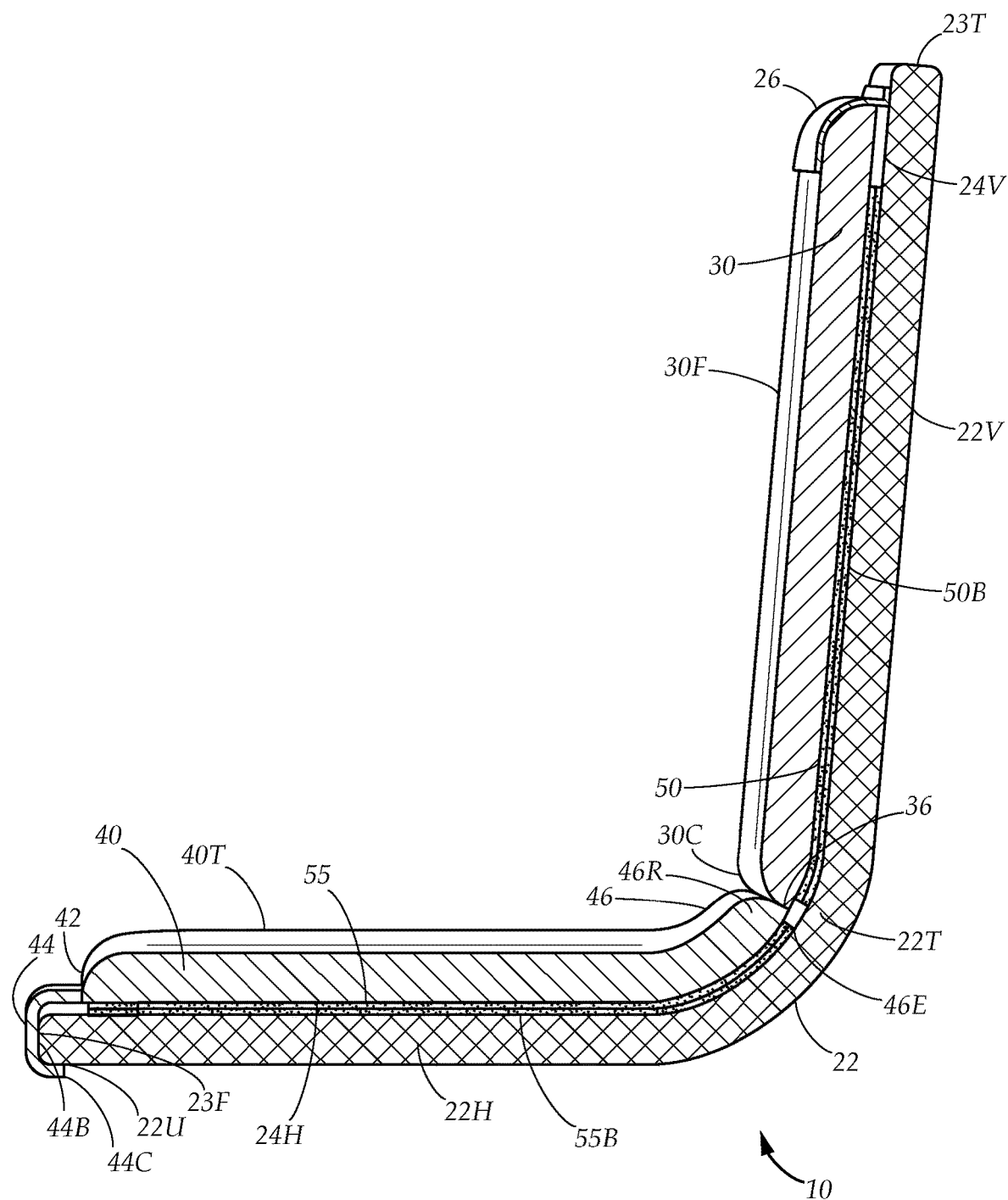
FIG. 8 is a sectional side view of the seating unit showing the back panel and seat panel attached to the seat frame in the interlocking arrangement, in accordance with an embodiment of the present disclosure.

Turning now to FIGS. 6-8 while also referring to FIG. 2B and FIG. 3, the seat panel 40 is installed by first positioning the seat panel 40 such that the seat panel bottom face 40U is facing the horizontal face 24H and the bend 44B of the retaining hook 44 catches and retains the front frame edge 23F at approximately the center thereof. The seat panel rear 46 is angled away from the horizontal face 24H to prevent the seat panel fasteners 55 from prematurely engaging with the horizontal portion fasteners 55B. The seat panel 40 is then lowered onto the horizontal face 24H while the front frame edge 23F remains retained within the retaining hook 44 such that the seat panel fasteners 55 engage with the horizontal portion fasteners 55B. In a preferred embodiment, as the seat panel 40 is lowered into position, the seat panel front fastener 60 engages the horizontal portion front fastener 60B. Next, the seat panel side fasteners engage with the horizontal portion side fasteners 58B, and finally the seat panel rear fastener 56 engages with the horizontal portion rear fastener 56B. Once the seat panel 40 is fully attached to the horizontal face 24H, the seat panel rear edge 46E abuts against the back panel lower edge 36, completing the interlocking arrangement.

FIG. 8 further details the interlocking arrangement of the back panel 30 and seat panel 40 with the seat frame 22. In addition to the engagement between the panel fasteners and the seat frame fasteners which secures the back panel and the seat panel to the vertical and horizontal faces 24V, 24H respectively, the back panel lower edge 36 exerts a downward force against the seat panel rear edge 46E. Turning back to FIG. 7 while continuing to refer to FIG. 8, the seat panel 40 has a length, as defined by the distance between the seat panel front edge 42 and the seat panel rear edge 46E, which is sufficient to cause the seat panel rear edge 46E to contact the back panel front face 30F before the seat panel 40 is fully lowered onto horizontal face 24H and the seat panel fasteners 55 fully engage with the horizontal portion fasteners 55B. Were the seat panel 40 to be formed from a rigid material, the contact between the seat panel rear edge 46E and the back panel 40 would obstruct any further lowering of the seat panel 40. However, the seat panel 40 may be formed using a strong but flexible material such as ABS plastic, so that when a downward force is applied against the seat panel top face 40T, the seat panel rear 46 deflects upwardly allowing the seat panel rear edge 46E to slide along the back panel front face 30F until the seat panel rear edge 46E snaps into place below the back panel 30, where the seat panel rear edge 46E contacts and abuts the back panel lower edge 36. In certain situations where it is difficult to cause the seat panel 40 to deflect sufficiently by hand, the seat panel 40 may be pushed downward with the assistance of a tool such as a mallet 90. Once the seat panel 40 is lowered into place and is attached to the horizontal portion 22H, sufficient tension remains in the flexible seat panel 40 to ensure that the seat panel rear edge 46E and the back panel lower edge 36 push against each other, keeping the seat panel rear 46 pressed against transition portion 22T and the horizontal face 24H and preventing a person from lifting the seat panel rear edge 46. Furthermore, the retaining hooking edge 44C hooks around the front frame edge 23F to contact the frame bottom 22U, preventing the seat panel front edge 42 from being lifted off the horizontal face 24H. In addition, the engagement between the seat panel fasteners 55 and the horizontal portion fasteners 55B prevents the seat panel 40 from being moved laterally or longitudinally. Similarly, the engagement between the back panel fasteners 50 and the vertical portion fasteners 50B prevents the back panel 30 from moving laterally, while the retaining cap 26 prevents the back panel top edge 32 from being lifted off the vertical face 24V. Finally, the retaining cap 26 also prevents the back panel 30 from being displaced upwardly as a result of pressure from the seat panel rear edge 46E, and can further be positioned to exert a downward force upon the back panel 30. The interlocking arrangement therefore prevents a person such as a passenger from removing the back panel 30 or seat panel 40 by hand, but still allows the back panel 30 or seat panel 40 to be removed from the vertical face 24V or horizontal face 24H through the use of a tool such as a lever to overcome the peel strength of the engaged panel and seat frame fasteners. For example, in a reversal of the installation process, the back panel 30 may be removed first from its position on the vertical face 24V, which in turn allows the seat panel 40 to be lifted off the horizontal face 24H.

In an alternate embodiment, the back panel 30 may be configured so that the back panel lower edge 36 and the back panel front face 30F form a back panel lower corner 36C which projects away from the vertical face 24V. The back panel front face 30F projects sufficiently away from the vertical face 24V such that back panel lower corner 36C overhangs the seat panel rear edge 46E and blocks the seat panel rear edge 46E from being lifted upwards once it has been attached to the seat frame 22. This allows the interlocking arrangement of the back panel 30 and seat panel 40 to secure the seat panel 40 in embodiments where the seat panel 40 does not exert an upward force against the back panel lower edge 36 once the seat panel rear edge 46E has snapped into place or is otherwise positioned below the back panel 30.

Figure 9:
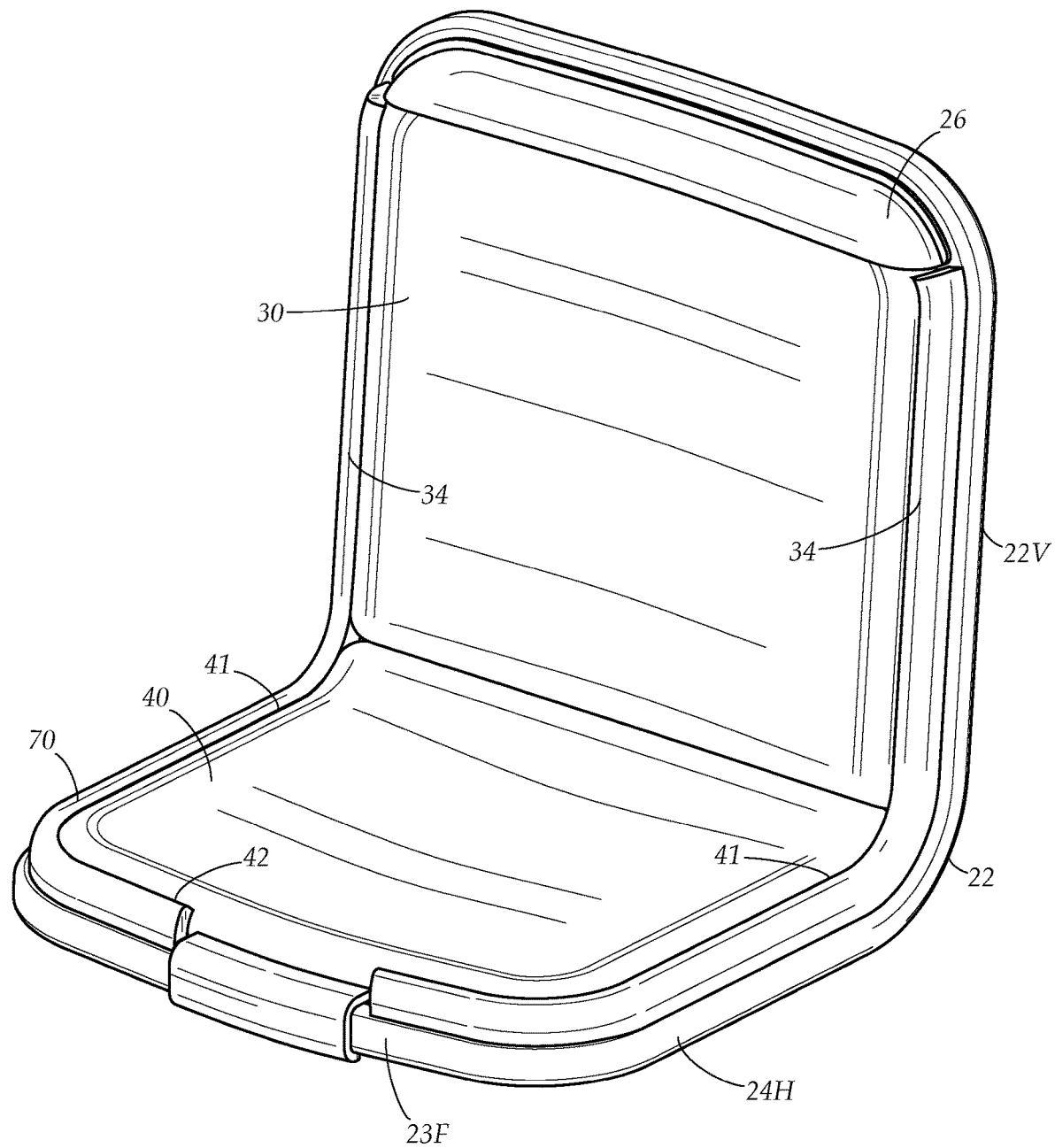
FIG. 9 is a diagrammatical perspective view of an embodiment of the seating unit with a seat frame lip, in accordance with an embodiment of the present disclosure.

Turning now to FIG. 9, while also referring to FIGS. 1 and 8, the seat frame 22 may further have a seat frame lip 70 which projects upwardly from the horizontal face 24H and vertical face 24V to surround the back panel 30 along the back panel sides 34, and the seat panel 40 along the seat panel sides 41 and seat panel front edge 42, preventing a person from employing fingers or tools in order to pry the back panel 30 or the seat panel 40 off the seat frame 22. The seat frame lip 70 may have an opening adapted to allow the retaining hook to hook onto the front frame edge. In order to allow for the seat panel 40 and back panel 30 to be removed, the retaining cap 26 may be detachably connected to the vertical portion 22V through the use of screws or similar fasteners. Detaching the retaining cap 26 allows the now exposed back panel top edge 32, which is not surrounded by the seat frame lip, to be accessed and lifted off the vertical face 24V, allowing the entire back panel 30 to be detached by disengaging the back panel fasteners from the vertical portion fasteners. Once the back panel 30 is detached, the back panel lower edge 36 ceases to push down against the seat panel rear edge 46E. The seat panel 40 may then be detached from the horizontal face 24H by first lifting the seat panel rear edge 46E, disengaging the seat panel fasteners from the horizontal portion fasteners, and unhooking the retaining hook 44 from the front frame edge 23F. Furthermore, as access to the back panel top edge 32 and the seat panel rear edge 46E are not blocked by the seat frame lip, a lever or other tool may be used to assist in the removal of the back panel 30 and seat panel 40.

Note that the back panel 30 and seat panel 40 are not limited to rectangular configurations, and can be formed in other shapes and configurations in adherence with the principles of the present disclosure.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a vehicle seat with secure interlocking panels. The disclosure is illustrated by example in the drawing figures, and throughout the written description. It should be understood that numerous variations are possible, while adhering to the inventive concept. Such variations are contemplated as being a part of the present disclosure.

What is claimed is:

1. A vehicle seating unit for supporting a passenger having a back and lower body, the seating unit comprising:
    a seat frame having a horizontal portion and a vertical portion which extends upwardly away from the horizontal portion in a substantially perpendicular direction, the horizontal portion having a horizontal face, a frame front edge, a frame bottom disposed opposite the horizontal face, and a plurality of horizontal portion fasteners positioned on the horizontal face, the vertical portion has a vertical face, a seat frame top edge, and a plurality of vertical portion fasteners positioned on the vertical face, the seat frame further has a transitional portion which joins the horizontal portion to the vertical portion and is upwardly curved;
    a back panel for supporting the back of the passenger in a seated position, the back panel having a back panel front face, a back panel rear face disposed opposite the back panel front face, a back panel top edge, a back panel lower edge, and a plurality of back panel fasteners positioned on the back panel rear face, the back panel is adapted to attach to the vertical face via an engagement between the back panel fasteners and the vertical portion fasteners;
    a seat panel for supporting the lower body of the passenger in the seated position, the seat panel having a seat panel top face, a seat panel front edge, a seat panel bottom face disposed opposite to the seat panel top face, a seat panel rear edge adapted to abut against the back panel lower edge proximate to the transition portion, and a plurality of seat panel fasteners positioned on the seat panel bottom face, the seat panel is adapted to attach to the horizontal face via an engagement between the seat panel fasteners and the horizontal portion fasteners, the seat panel has a raised portion whereby the seat panel rear edge extends upwardly at an angle to conform with the curve of the transition portion, the seat panel further has a retaining hook which projects from the seat panel front edge, the retaining hook is adapted to catch and hook onto the front frame edge and prevent the seat panel front edge from being lifted upwardly off the horizontal face when the seat panel is attached thereon;
    a retaining cap positioned on the vertical face along the seat frame top edge, the retaining cap having a retaining cap opening which opens downwardly and is adapted to receive and retain the back panel top edge; and
    wherein the seat panel and the back panel are adapted to be placed in an interlocking arrangement whereby the seat panel rear edge abuts against the back panel lower edge such that the back panel lower edge and seat panel rear edge push against each other, thereby preventing the seat panel from being lifted upwards off the horizontal face.

2. The vehicle seating unit as described in claim 1, wherein the seat panel is formed from a flexible material such that the raised portion is adapted to deflect upwardly.

3. The vehicle seating unit as described in claim 2, wherein the seat panel has a length defined as the distance between the seat panel front edge and the seat panel rear edge, which is sufficient to create tension within the seat panel as the seat panel rear edge abuts against the back panel lower edge, allowing the seat panel rear edge to exert an upward force against the back panel bottom edge when the seat panel and back panel are placed in the interlocking arrangement.

4. The vehicle seating unit as described in claim 3, wherein the seat panel fasteners, back panel fasteners, the vertical portion fasteners, and the horizontal portion fasteners are hook and loop fasteners, wherein said fasteners have a peel strength sufficient to prevent a person from removing the seat panel or the back panel from the horizontal face or the vertical face by hand.

5. The vehicle seating unit as described in claim 4, wherein:
    the back panel further has a back panel outer edge, and the back panel fasteners are positioned on the back panel rear face proximate to the back panel outer edge, whereby the vertical portion fasteners are positioned to engage with the back panel fasteners proximate to the back panel outer edge, and the engagement of the back panel fasteners with the vertical portion fasteners prevents the insertion of fingers between the back panel and the vertical face; and
    the seat panel further has a seat panel outer edge, and the seat panel fasteners are positioned on the seat panel bottom face proximate to the seat panel outer edge, whereby the horizontal portion fasteners are positioned on the horizontal face to engage the seat panel fasteners, and the engagement of the seat panel fasteners with the horizontal fasteners prevents the insertion of fingers between the seat panel and the horizontal face.

6. A method for securing seating panels to a seating unit, comprising the steps of:
    providing a seat frame having a horizontal portion and a vertical portion which extends upwardly away from the horizontal portion in a substantially perpendicular direction, the horizontal portion having a front face, a frame front edge, a frame bottom disposed opposite the horizontal face, and a plurality of horizontal portion fasteners positioned on the horizontal face, the vertical portion has a vertical face, a seat frame top edge, and a plurality of vertical portion fasteners positioned on the vertical face;

providing a back panel having a back panel front face, a back panel rear face disposed opposite the back panel front face, a back panel top edge, a back panel lower edge, a pair of back panel sides, and a plurality of back panel fasteners positioned on the back panel rear face;

providing a seat panel having a seat panel top face, a seat panel front edge, a seat panel bottom face disposed opposite to the seat panel top face, a seat panel rear edge, a pair of seat panel sides, and a plurality of seat panel fasteners positioned on the seat panel bottom face, the seat panel is flexible, allowing the seat panel rear edge to deflect upwardly, the seat panel further has a retaining hook which projects from the seat panel front edge, the retaining hook is adapted to catch and hook onto the front frame edge;

providing a retaining cap positioned on the vertical face along the seat frame top edge, the retaining cap having a retaining cap opening which opens downwardly and is adapted to receive and retain the back panel top edge;

attaching the back panel to the vertical face by inserting the back panel top edge into the retaining cap opening, and engaging the back panel fasteners with the vertical portion fasteners;

attaching the retaining hook to the front frame edge;

lowering the seat panel towards the horizontal face until the seat panel rear face contacts the back panel front face, applying a downward force to the seat panel upper face, and deflecting the seat panel rear edge upwardly to allow the seat panel rear edge to move downwardly along the back panel front face towards the back panel lower edge;

attaching the seat panel to the horizontal face by engaging the seat panel fasteners with the horizontal portion fasteners, and aligning the seat panel rear edge to contact the back panel lower edge; and creating an interlocking arrangement by abutting the seat panel rear edge against the back panel lower edge, exerting a downward force upon the back panel via the retaining cap whereby the back panel lower edge pushes against the seat panel rear edge, preventing the seat panel rear edge from being lifted off the horizontal face.

7. The method as described in claim 6, wherein:
the seat panel fasteners, back panel fasteners, the vertical portion fasteners, and the horizontal portion fasteners are hook and loop fasteners;
the step of attaching the back panel to the vertical face further comprises the step of: creating a peel force between the back panel fasteners and vertical portion fasteners to prevent the disengagement thereof by hand; and
the step of attaching the seat panel to the horizontal face further comprises the step of: creating a peel force between the seat panel fasteners and the horizontal portion fasteners to prevent the disengagement thereof by hand.

8. The method as described in claim 7, wherein the step of creating the interlocking arrangement is followed by the step of:
detaching the back panel and the seat panel from the seat frame by disengaging the back panel fasteners from the vertical portion fasteners and the seat panel fasteners from the horizontal portion fasteners using a lever.

9. The method as described in claim 7, further comprising the steps of:
providing a seat frame lip which projects from the vertical face to surround the back panel along the back panel sides when the back panel is attached to the vertical face, the seat frame lip further projects from the horizontal face to surround the seat panel along the seat panel front edge and the seat panel sides when the seat panel is attached to the horizontal face;
the step of creating the interlocking arrangement is followed by the step of: preventing the disengaging of the back panel fasteners from the vertical portion fasteners and the seat panel fasteners from the horizontal portion fasteners through the use of a lever, by blocking the insertion of the lever between the back panel and the vertical face and between the seat panel and the horizontal face using the seat frame lip.

10. The method as described in claim 9, wherein:
the retaining cap is detachably connected to the vertical portion using screws; and
the steps as recited are followed by the step of: detaching the back panel and the seat panel by detaching the retaining cap from the vertical portion, detaching the back panel from the vertical face by applying the lever along the back panel top edge, and detaching the seat panel from the horizontal face by applying the lever along the seat panel rear edge.

* * * * *